US009529777B2

(12) United States Patent
Tjew et al.

(10) Patent No.: US 9,529,777 B2
(45) Date of Patent: Dec. 27, 2016

(54) USER BEHAVIOR ANALYZER

(71) Applicant: Electronic Arts Inc., Redwood City, CA (US)

(72) Inventors: Andrew Tjew, Burnaby (CA); Wilson Chan, Burnaby (CA)

(73) Assignee: ELECTRONIC ARTS INC., Redwood City, CA (US)

( * ) Notice: Subject to any disclaimer, the term of this patent is extended or adjusted under 35 U.S.C. 154(b) by 357 days.

(21) Appl. No.: 13/662,319

(22) Filed: Oct. 26, 2012

(65) Prior Publication Data

US 2013/0111019 A1 May 2, 2013

Related U.S. Application Data

(60) Provisional application No. 61/552,825, filed on Oct. 28, 2011.

(51) Int. Cl.
*H04L 29/06* (2006.01)
*G06F 15/18* (2006.01)
(Continued)

(52) U.S. Cl.
CPC ............ *G06F 15/18* (2013.01); *G06N 99/005* (2013.01); *H04L 63/1416* (2013.01);
(Continued)

(58) Field of Classification Search
CPC .. H04L 41/12; H04L 41/5009; H04L 63/1458; H04L 12/585; H04L 51/12; G06F 21/00; G06F 21/50; G06F 21/55; G06F 21/552; G06F 21/56; G06Q 10/10; G06Q 10/00
(Continued)

(56) References Cited

U.S. PATENT DOCUMENTS 6,769,016 B2 *  7/2004  Rothwell ............. H04L 12/585
                                                       706/20
7,974,849 B1 *  7/2011  Begole ............... G06Q 10/0631
                                                       705/1.1
(Continued)

OTHER PUBLICATIONS

"Blizzard Entertainment Uses Spyware to Verify EULA Compliance", Schneier on Security, posted Oct. 13, 2005, retrieved Aug. 14, 2015, http://www.schneier.com/blog/archives/2005/10/blizzard_entert.html, 25 pgs.
(Continued)

*Primary Examiner* — Barbara Burgess
(74) *Attorney, Agent, or Firm* — Knobbe, Martens, Olson & Bear, LLP

(57) ABSTRACT

A system and method is shown for identifying abnormal client behavior with respect to communications between one or more servers and one or more client devices communicatively coupled to the one or more servers. Messages are received at a server from one or more client devices communicatively coupled to the server. The plurality of messages are grouped into subsets of messages using a learn module of the server. Each subset of messages is associated with a unique client identifier, and all messages within a subset are associated with the same unique client identifier. Each message within a subset of messages is identified as belonging to a defined type of message. Sequences of the defined types of messages within each of said subsets of messages are recorded using the learn module. Time intervals between the defined types of messages are measured using the learn module. The recorded sequences of defined types of messages and the measured time intervals between the defined types of messages are designated as constituting normal client behavior.

18 Claims, 4 Drawing Sheets

(51) Int. Cl.
    *G06N 99/00*  (2010.01)
    *G06Q 10/06*  (2012.01)
    *G06F 21/00*  (2013.01)
    *G06F 11/34*  (2006.01)

(52) U.S. Cl.
    CPC ...... *H04L 63/1458* (2013.01); *G06F 11/3447* (2013.01); *G06F 21/00* (2013.01); *G06Q 10/06* (2013.01); *G06Q 10/0631* (2013.01)

(58) Field of Classification Search
    USPC .......................... 709/203, 206, 207, 223, 224
    See application file for complete search history.

(56) References Cited

U.S. PATENT DOCUMENTS

| | | | | |
|---|---|---|---|---|
| 2002/0165838 | A1* | 11/2002 | Vetter | G06F 11/3447 706/20 |
| 2004/0039630 | A1* | 2/2004 | Begole | G06Q 10/105 705/320 |
| 2006/0036727 | A1* | 2/2006 | Kurapati | H04L 63/1458 709/224 |
| 2007/0043851 | A1* | 2/2007 | Yellamraju | H04L 63/1416 709/224 |
| 2007/0121596 | A1* | 5/2007 | Kurapati | H04L 29/06027 370/356 |
| 2007/0266394 | A1* | 11/2007 | Odent | G06Q 10/06 719/316 |
| 2011/0012603 | A1* | 1/2011 | Bose | G01R 31/3274 324/418 |
| 2012/0137367 | A1* | 5/2012 | Dupont | G06F 21/00 726/25 |

OTHER PUBLICATIONS

Cao, Qiang, et al. "Aiding the Detection of Fake Accounts in Large Scale Social Online Services", http://www.usenix.org/system/files/conference/nsdi12/nsdi12-final42_2.pdf, accessed Aug. 6, 2015, 14 pgs.

Ward, Mark, "Warcraft Game Maker in Spying Row", BBC News, published Oct. 31, 2005, retrieved Aug. 14, 2015, 1 pg.

* cited by examiner

USER BEHAVIOR ANALYZER

FIELD

The present disclosure relates to a system and method for identifying abnormal client behavior based on communications between client devices and a server.

SUMMARY

According to various embodiments of the present disclosure, a method is provided for identifying abnormal client behavior with respect to communications between one or more servers and one or more client devices communicatively coupled to the one or more servers. A plurality of messages are received at a server from one or more client devices communicatively coupled to the server. The plurality of messages are grouped into subsets of messages using a learn module of the server. Each subset of messages is associated with a unique client identifier, and all messages within a subset are associated with the same unique client identifier. Each message within a subset of messages is identified as belonging to a defined type of message. Sequences of the defined types of messages within each of the subsets of messages are recorded using the learn module. Time intervals between the defined types of messages are measured using the learn module. The recorded sequences of defined types of messages and the measured time intervals between the defined types of messages are designated as constituting normal client behavior. A detect module of the server constructs a sequence of defined types of messages received from a client device and compares the constructed sequence of defined types of messages to a corresponding sequence of messages recorded by the learn module and designated as normal client behavior. Any differences between the constructed sequence and the corresponding recorded sequence are determined, and a constructed sequence that differs from the corresponding recorded sequence by more than a predetermined value or range of values is designated as abnormal client behavior.

Embodiments of the present disclosure can be made using computer hardware to implement the functionality, computer software comprising program code made up of instructions that, when executed, perform that functionality, or some combination of computer hardware and computer software. The computer software can be executed on special-purpose game hardware or a general-purpose programmable device or system. Various embodiments can also be embodied on computer-readable media that, when combined with a computer or computing device, implements the various embodiments. Such media might include CD-ROM, DVD, or networked storage such as an Internet-connected file server. A non-transitory computer readable medium can be provided and encoded with instructions adapted to be executed by a processor to perform method steps according to various embodiments of the present invention.

The following detailed description together with the accompanying drawings will provide a better understanding of the nature and advantages of the present invention.

DETAILED DESCRIPTION

Figure 1:
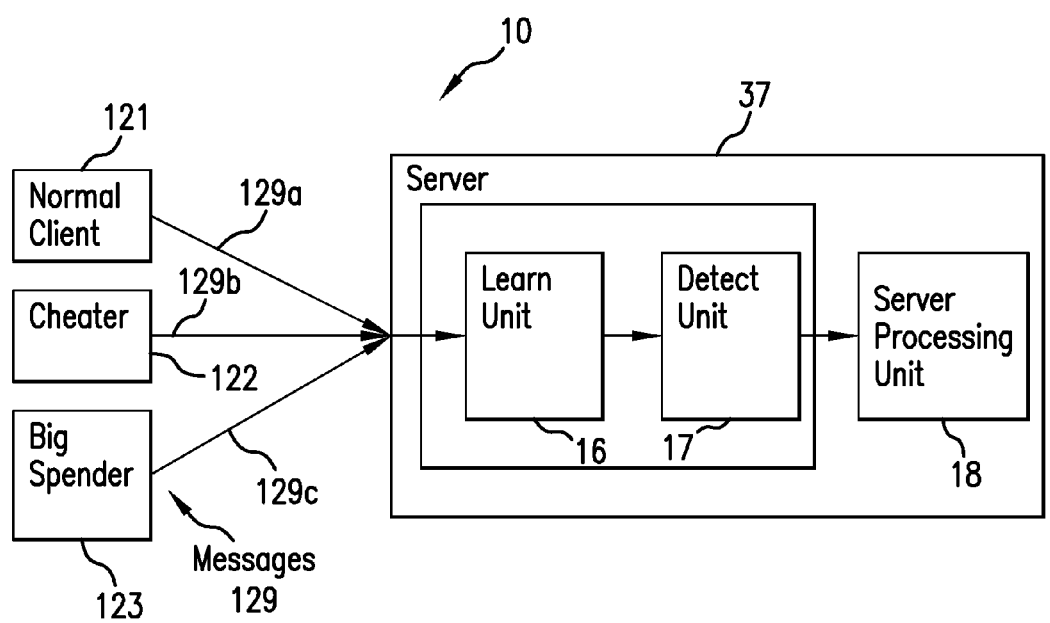
FIG. 1 illustrates a user behavior analyzer system according to an embodiment of the present invention.

Referring initially to an exemplary embodiment of the present disclosure shown in FIG. 1, a user behavior analyzer system 10 is shown to include client devices 121, 122, and 123 communicatively coupled to a server 37. The server 37 includes a learn unit or module 16, a detect unit or module 17, and a server processing unit or module 18. The client devices can be operated by, and are representative of users or players of a game or other interactive application communicatively coupled to a game server or other centrally located data and application management system.

The above-described client devices and server of the exemplary embodiment can include, for example, any suitable servers, workstations, PCs, laptop computers, PDAs, Internet appliances, handheld devices, cellular telephones, wireless devices, and other devices, capable of performing the processes of the exemplary embodiments. Multiple devices, servers, systems, and subsystems according to the exemplary embodiments can communicate with each other using any suitable protocol and can be implemented using one or more programmed computer systems or devices, such as the computer system 20 shown in FIG. 3.

One or more interface mechanisms can be used with the exemplary embodiments, including, for example, Internet access, telecommunications in any suitable form (e.g., voice, modem, and the like), wireless communications media, and the like. For example, employed communications networks or links can include one or more wireless communications networks, cellular communications networks, G3 communications networks, Public Switched Telephone Network (PSTNs), Packet Data Networks (PDNs), the Internet, intranets, a combination thereof, and the like.

It is to be understood that the devices, servers, systems, and subsystems of the exemplary embodiments are for exemplary purposes, as many variations of the specific hardware used to implement the exemplary embodiments are possible, as will be appreciated by those skilled in the relevant art(s). For example, the functionality of one or more of the devices, servers, systems, and subsystems of the exemplary embodiments can be implemented via one or more programmed computer systems or devices, and the devices can include processors and memory maintained on a central server or system of servers, sometimes referred to as "on the cloud".

To implement such variations as well as other variations, a single mobile device or computer system can be programmed to perform the special purpose functions of one or more of the devices, servers, systems, and subsystems of the exemplary embodiments. On the other hand, two or more programmed computer systems or devices can be substituted for any one of the devices, servers, systems, and subsystems of the exemplary embodiments. Accordingly, principles and advantages of distributed processing, such as redundancy, shared information between users, replication, and the like, also can be implemented, as desired, to increase the robustness and performance of the devices, servers, systems, and subsystems of the exemplary embodiments.

The devices, servers, systems, and subsystems of the exemplary embodiments can store information relating to various processes described herein. This information can be stored in one or more memories, such as a hard disk, optical disk, magneto-optical disk, RAM, and the like, of the devices, servers, systems, and subsystems of the exemplary embodiments. One or more databases of the devices, servers, systems, and subsystems of the exemplary embodiments can store the information used to implement the exemplary embodiments. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices, servers, systems, and subsystems of the exemplary embodiments in one or more databases thereof.

All or a portion of the devices, servers, systems, and subsystems of the exemplary embodiments can be conveniently implemented using one or more general purpose computer systems, processing units or modules, microprocessors, digital signal processors, micro-controllers, and the like, programmed according to the teachings of the exemplary embodiments, as will be appreciated by those skilled in the computer and software arts. Appropriate software can be readily prepared by programmers of ordinary skill based on the teachings of the exemplary embodiments, as will be appreciated by those skilled in the software art. Further, the devices, servers, systems, and subsystems of the exemplary embodiments can be implemented on the World Wide Web. In addition, the devices, servers, systems, and subsystems of the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware circuitry and/or software.

Stored on any one or on a combination of computer readable media, the exemplary embodiments can include software for controlling the devices, servers, systems, and subsystems of the exemplary embodiments, for driving the devices, servers, systems, and subsystems of the exemplary embodiments, for enabling the devices, servers, systems, and subsystems of the exemplary embodiments to interact with a human user, and the like. Such software can include, but is not limited to, device drivers, firmware, operating systems, development tools, applications software, and the like. Such computer readable media further can include the computer program product of an embodiment for performing all or a portion (if processing is distributed) of the processing performed in implementing the embodiments. Computer code devices of the exemplary embodiments can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the exemplary embodiments can be distributed for better performance, reliability, cost, and the like.

As stated above, the devices, servers, systems, and subsystems of the exemplary embodiments can include computer readable medium or memories for holding instructions programmed according to the teachings of the embodiments and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

Figure 3:
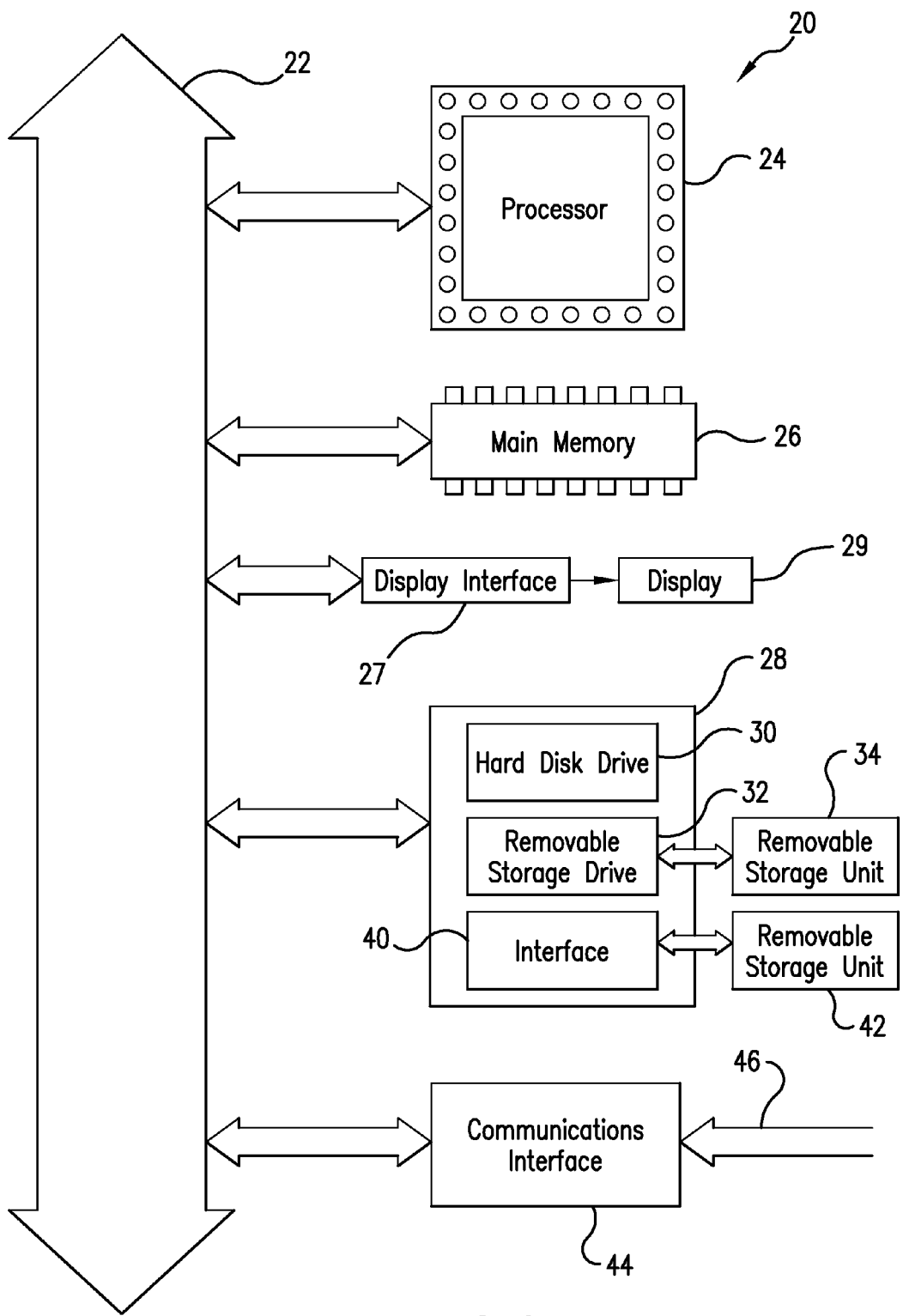
FIG. 3 illustrates exemplary computer architecture that could be used to implement the user behavior analyzer system according to one embodiment of the present invention.

Various embodiments may be implemented using hardware, software or a combination thereof and may be implemented in one or more computer systems or other processing systems. An example of a computer system 20 is shown in FIG. 3. The computer system 20 represents any single or multi-processor computer. In conjunction, single-threaded and multi-threaded applications can be used. Unified or distributed memory systems can be used. Computer system 20, or portions thereof, may be used to implement various embodiments.

In one example, the system of various embodiments can be implemented in a multi-platform (platform independent) programming language such as JAVA, programming language/structured query language (PL/SQL), hyper-text mark-up language (HTML), practical extraction report language (PERL), common translator interface/structured query language (CGI/SQL) or the like. Java-enabled and JavaScript-enabled browsers are used, such as, Netscape, HotJava, and Microsoft Explorer browsers. Active content Web pages can be used. Such active content Web pages can include Java applets or ActiveX controls, or any other active content technology developed now or in the future. Various embodiments, however, are not intended to be limited to Java, JavaScript, or their enabled browsers, developed now or in the future, as would be apparent to a person skilled in the relevant art(s) given this description.

In another example, the system of various embodiments, can be implemented using a high-level programming language (e.g., C or C++) and applications written for the Microsoft Windows 2000, Linux or Solaris environments. It will be apparent to persons skilled in the relevant art(s) how to implement the invention in alternative embodiments from the teachings herein.

Generally, the user behavior analyzer system according to various embodiments comprises software modules adapted to perform varying functionality during interaction of a user with a server via a communication device. Accordingly, the user behavior analyzer system can include a user interface for interacting with a user accessing the user behavior analyzer system and application logic for properly implementing the offered functionality of the user interface. One skilled in the art will recognize that the user behavior analyzer system can embody a variety of interactive systems. Such interactive systems include, but are not limited to, access to a central game server through web sites and applications, game consoles, mobile computing devices such as computers, smart phones, tablets and other mobile computing devices, interactive voice response (IVR) systems—including speech recognition, and other similar systems. The user behavior analyzer system may also be a combination of multiple interactive sub-systems such as those mentioned above, thereby interacting with the user via multiple channels—each with their own system made up of a user interface and application logic. In such a case, the learn module 16 and detect module 17 of the server 37 in the exemplary and illustrative embodiment of FIG. 1 would be collecting and analyzing data received through multiple channels.

The user behavior analyzer system 10 is adapted and configured to analyze and/or monitor user activity in the user behavior analyzer system 10. The user behavior analyzer system 10, therefore, comprises software modules and hardware for performing the functionality and operational characteristics described herein. Upon the analyzing of user behavior or activity on the user behavior analyzer system 10, the user behavior analyzer system 10 can provide recommendations or actions based on client communications. The recommendations or actions can include, but are not limited to, recommending directing additional advertisements, prizes, incentives, etc. to a client determined to be spending an abnormal amount of money in the system, or restricting access to the game server for a client determined to be cheating or otherwise deviating from protocols or desired behaviors.

In operation, the user behavior analyzer system 10 can analyze interaction of one or more clients or users with the user behavior analyzer system in the context of the user behavior analyzer system's structure, and even report on the behavior of the users and how the structure of the user behavior analyzer system, or design of the games or other interactive applications being participated in by the users, can be improved to better facilitate the goals of the users and the goals of the user behavior analyzer system's designers. Through a generic approach to modeling the user behavior analyzer system 10, described more fully below, and modeling user behavior of the users communicating with the user behavior analyzer system 10, the system 10 can be applied in many different system domains. Additionally, the system can be configured to analyze user behavior across multiple domains through several related systems. For example, the system 10 can be designed and configured to follow a user, based on persistent user data stored in a memory, for example, from an interactive web-based gaming system where the user is playing at a computer terminal, to a game console-based gaming system where the user is playing on a game console, to a mobile application where the user is playing from a smart phone or other portable device, to analyzing user behavior across different channels. While several example domains may be discussed within the description, one skilled in the art will recognize that embodiments of the present invention can be adapted for use with a variety of domains.

Clients or users 121, 122, 123 of many interactive systems are human, including those users described above in the provided examples. Those skilled in the art will recognize, however, that the user behavior analyzer system 10 could be used to analyze system behavior when the user of the system is not human. For example, the user behavior analyzer system 10 might be a network management system where the users are various network devices.

The user behavior analyzer system 10 can be designed and implemented with software modules using an object-oriented paradigm and, therefore, components described herein can map to interfaces, classes, and objects in the implementation language. The user behavior analyzer system 10 can allow an analyst to model the user behavior analyzer system, provide event, activity or behavior trace logs for analysis, create the data that fuses the structural model and behavior, and define, execute and view reports based on the data.

The user behavior analyzer system can also comprise more than one subsystem, where the subsystems can be in communication with each other directly or indirectly. Additionally, the user behavior analyzer system 10 can communicate with each of the clients or users through a network environment. One skilled in the art will recognize that the network over which the clients and the server communicate can contain the infrastructure and facilities appropriate to connect a group of two or more communication devices.

The client devices and server can be configured in multiple network topologies including, but not limited to, peer-to-peer or client/server architectures. In an exemplary embodiment such as shown in FIG. 1, the network allowing for the communication of messages 129a, 129b, and 129c from clients 121, 122, and 123, respectively, to server 37 may additionally be classified by the geographical location of the server 37 and the client devices, and the types thereof.

In accordance with the above description of various exemplary embodiments of methods and systems according to the present invention for the interactive communication between client devices and a game server 37 or other central processing system, examples of foreseeable problems or challenges that the system is designed to deal with include that some clients 122 may attempt to cheat the game, and some clients 123 are big spenders, while most clients 121 behave as expected. In one exemplary embodiment, a client 121, 122, 123 can send messages 129 to a server 37. The messages can be processed by a learn unit or module 16 and a detect unit or module 17 before being sent to a server processing unit 18.

Detection of abnormal client behavior using an anomaly-based detection approach, according to various exemplary embodiments of the present disclosure, complements a signature-based approach by offering a means to detect abnormal behaviors whose signatures are not yet known or that exhibit modified behavior (e.g., intentionally stealthy behavior or variants of existing behavior in new environments). The user behavior analyzer system 10 according to various embodiments can be configured to apply to any entity whose relevant state or behavior is under observation. For example, various embodiments of the system can be used to monitor communications from a host or server, or a given network application, or one or more users or clients. The user behavior analyzer system 10 can be implemented in accordance with a number of operations. First, measures (or observations) of normalcy are defined for a given set of communications using the learn unit or module 16. Next, a characterization of the normalcy of the communications is created. This characterization can be in a form of deviations from an expected pattern or sequence of communications, expected sequence of types of communications, frequency of particular sequences of messages, timing of sequences of messages, timing between certain types of messages in the communications, etc. This may require a learning or training process, which can be performed by the learn unit or module 16 shown in FIG. 1.

Next, an algorithm for building a run-time characterization of the communications can be defined. Measures of discrepancy between the normalcy and the run-time characterization can then be defined. Once again, this step may require learning or training. The measure of discrepancy and the way the actual measurement is obtained can introduce inherent differences that are accounted for in a threshold determination step. Finally, anomaly thresholds for generating appropriate alarms, notifications, or actions can be defined. This approach can be implemented using multiple techniques, including statistical, neural networks, and other forms of learning mechanisms.

The user behavior analyzer system 10 can create a characterization of normal client communications behavior in order to achieve accurate anomaly detection (i.e., with low false positive and low false negative rates). Since entities, such as clients or users, network applications, servers, etc. can have different behaviors, a new characterization can be created for each new application or application program interface to be monitored through anomaly detection. In one exemplary embodiment of the disclosure, the user behavior analyzer system 10 can operate in two phases. In a learning or training phase, the targeted communications could be in a state for which a relatively high level of confidence in the normalcy of the communications can be determined. Depending on the resource availability, the learning or training phase could be conducted either online or offline. In the online case, training data comes directly from the real-time communications captured while the system is in operation. In the offline case, training data comes from historical or previously captured and recorded sequences of messages, which are stored in a file. The length of the learning or training phase can depend on the inherent variability of the types and frequencies of communications received for particular applications. The learning or training phase can stop automatically when certain stability criteria have been met. However, the ability to turn on the learning or training mode at any time could be provided and programmed into the learn unit or module 16.

After conclusion of the learning or training phase, the detect unit or module 17 can operate in a detection phase. The detection phase can produce anomaly scores for the observed communications based on the characteristic similarity between the observed and normal profiles. A higher score could indicate a higher degree of deviation from the normalcy and thus a stronger indication of abnormal client behavior.

While the learning or training phase can account for the differences in characteristics and patterns of communications received from different applications, there could also be variability in attributes including, but not limited to, time (e.g., the time of day) that may be significant enough to require new profiles for effective detection of abnormal client behavior. The learn module can be designed to support various means for adaptation. As non-limiting examples of these means for adaptation, an interface could be provided for human analysts, to allow the input of final alert assessment results and to keep track of the false alarm rate changes. In the case where false positives of apparent abnormal client behavior increases and stays at a higher level, this can be considered a good indication of a system/environment change that can be accounted for by re-training the learn unit. In the case where the rate of false positives of apparent abnormal client behavior fluctuates periodically with time, it can be considered to be a good indication that a new set of profiles with a different periodicity is required.

Another adaptive technique that can be implemented by the learn unit or module 16 is to support multiple profiles that can be dynamically updated with time, or equivalently one profile that adapts continuously but more quickly. To better support creation of new profiles dynamically, the data received by the learn unit that is determined to be characteristic of anomalous sequences of messages could be kept in a log file until it is determined at a later time that they were normal, or they could be moved to long-term archive. At that time, these logged sequences could be used to create new profiles or to re-train existing profiles.

The learn unit or module 16 can be configured to learn about aggregate average client behavior. A state machine can be used to model the behavior of a client in the types, sequence, timing, and frequency of communications or messages between the client and a central server or other processing device. As shown in an exemplary embodiment illustrated in FIG. 2, a state machine 140 can be presented as a graph consisting of nodes 52, 54, 56, and 58 connected by directed edges 62, 64, 66, 68, and 70. The nodes 52, 54, 56, and 58 can be representative of particular states, where a state is a particular and distinct action or behavior. A directed edge 62 connecting node or state 52 to node or state 54 represents the statement that an action B of the node 54 is permitted to follow from an action A of the node 52. The absence of an edge going from the action B of node 54 to the action C of node 56 is representative of the statement that action C does not directly follow the action B.

Figure 2:
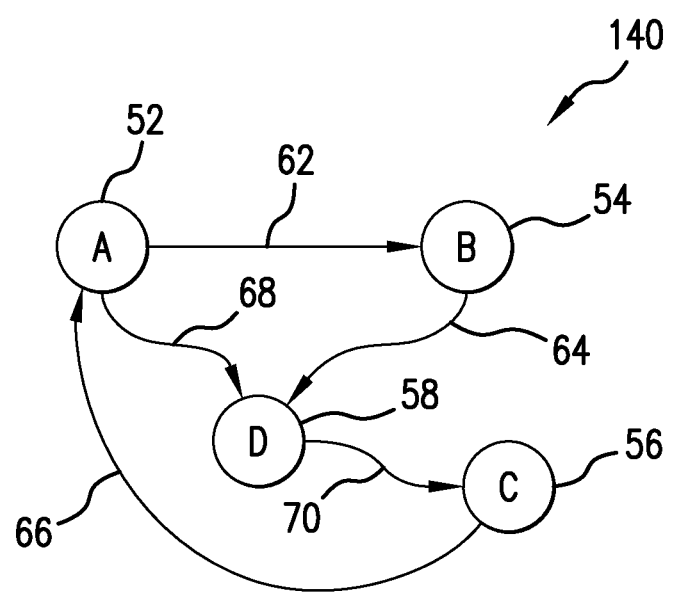
FIG. 2 illustrates a state machine implemented by the user behavior analyzer system of FIG. 1 according to an embodiment of the present invention.

The user behavior analyzer system 10 can be configured or adapted to model the communications between clients and server into one or more state machines. A client or user provides inputs and receives outputs through a user interface. The communications a user sends to the server, such as messages 129a, 129b, and 129c in FIG. 1, can be represented by the user behavior analyzer system learn unit 16 as a sequence of states and transitions between those states (also referred to herein as a "state machine 140"). As defined by the user behavior analyzer system learn unit 16, state machine 140 for the client communications may be made up of states for each type of communication (e.g., log-in message, buy item message, play message, sell item message, auction message, end match message, etc.) provided by the user interface, with transitions between inputs made by a user at the user interface indicating possible changes to another unit of interaction based on user input and the context or state of the user behavior analyzer system 10. For example, and not by way of limitation, the user behavior analyzer system 10 may be an internet gaming site that provides access to interactive video games. In an exemplary embodiment, such as shown in FIG. 2, a state machine 140 for a gaming application can be created with a state or node for each message sent by a user to the game server over the internet. State transitions or edges, such as edge 62 between states 52 and 54, edge 64 between states 54 and 58, edge 66 between states 56 and 52, edge 68 between states 52 and 58, and edge 70 between states 58 and 56 in FIG. 2, can represent the normal transitions and sequences of particular types of messages communicated by a user during participation in an interactive video game.

The learn unit 16 can create state machines that evolve and change over time to model changes in what is considered normal client behavior during interactions with the gaming server 37.

As shown in the exemplary embodiment of FIG. 1, a message 129a communicated between a client 121 and a server 37 can comprise a type of message and an associated parameter or parameters. The learn unit or module 16 shown in FIG. 1 can receive a raw stream of messages 129a, 129b, and 129c sent by multiple clients 121, 122, and 123. As further illustrated in the flow chart of FIG. 4, after receiving messages (step 402) at the server 37, the learn unit 16 can separate and group (step 404) the raw stream of messages into multiple, separated client streams of messages. The separation or grouping (step 404) of the client streams of messages into subsets of messages can be achieved in various ways, including providing each message 129 with a unique client identifier as a parameter, and associating each subset of messages with a unique client identifier, with all messages within a subset being associated with the same unique client identifier (step 406). In one exemplary embodiment, and as shown in step 408 of FIG. 4, the learn unit 16 can also identify each message within a subset of messages as belonging to a defined type of message. Each type of message can be associated with a particular state used in the construction of a state machine such as state machine 140 referenced above. Since each message after an initial message sent by a client to the server follows a previous message, the learn unit 16 can record the sequences of defined types of messages and use the order of message types received to construct a state machine, as shown in step 410 of FIG. 4.

If a message of type B, such as the action or behavior associated with node 54 in FIG. 2 follows a message of type A, such as the action or behavior associated with node 52 in FIG. 2, the learn unit 16 can construct the states or nodes A and B with an edge 62 connecting A to B as shown in FIG. 2. By sampling a sufficiently large stream of messages 129 being sent from various clients 121, 122, and 123 to a server such as the server 37 shown in FIG. 2, the learn unit 16 can construct a reasonably complete state machine. The larger the stream sample, the more accurate the resultant state machine. The learn unit 16 can record the total number of states and state changes, such as represented by nodes 52, 54, 56, and 58 in FIG. 2, and the learn unit 16 may remove a state change edge, such as one or more of the edges 62, 64, 66, 68, and 70, if the total number of states and state changes is below some preset value or ratio.

The order in which certain message types in a client message stream are received by the learn unit 16 is a consequence of client behavior. Therefore, the learn unit 16 can sample message streams from "normal" clients, and the resultant state machine constructed by the learn unit 16 can be representative of the normal behavior patterns of clients.

Starting with a sample stream of messages, the learn unit records the sequences of subsequent state occurrences based on the sequences of types of messages sent from clients to the server. The length of a particular sequence recorded by the learn unit can range from a minimum value to a maximum value, with the minimum and maximum values being provided by an operator or being preset values. Thus, if a stream of messages contains the message types ACD-FABADC, and the minimum and maximum sequence lengths are set to 1 and 3 respectively, then the sequences recorded by the learn unit are: A, AC, ACD, AB, ABA, AD, ADC. Each entry in a sequence is a state. For all messages that the learn unit uses to build a sequence entry, the learn unit can use these messages to compute for each message parameter the average expectation and deviation value. Message parameters can include data such as the type of item purchased by the client, the number of items, the amount spent, etc. The learn unit may use a variety of statistical techniques to determine the average expectation, e.g. sample mean, weighted mean, median, etc. Similarly, the deviation can be stated with the standard deviation from the mean and the range bracketed by a minimum and maximum value. The learn unit associates all of these values to the corresponding entry in a sequence. As shown in step 414 of FIG. 4, the learn unit 16 can then designate particular sequences of the defined types of recorded messages as constituting "normal" client behavior.

Figure 4:
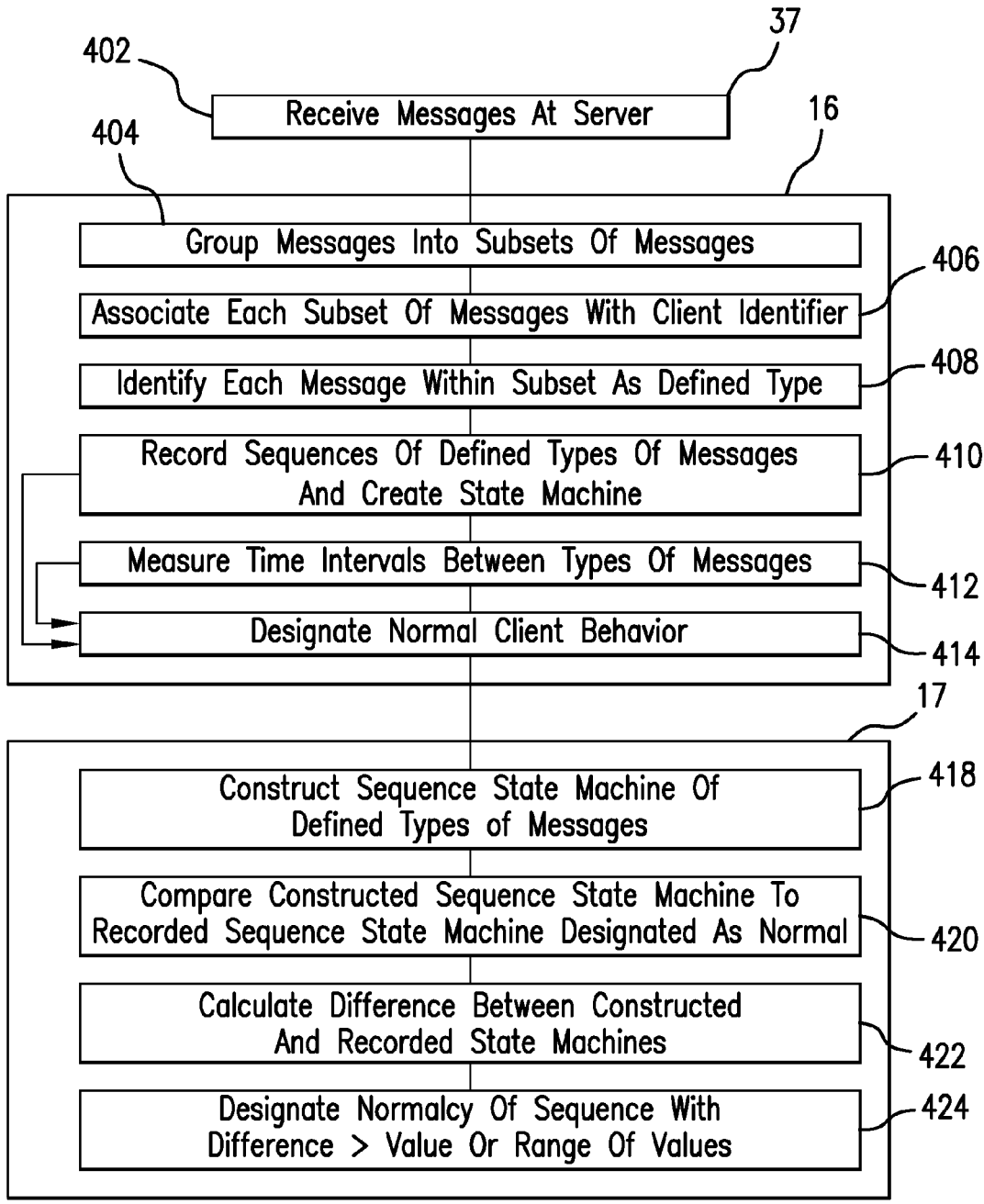
FIG. 4 illustrates a flow chart of method steps according to one embodiment of the present invention.

For the messages in a sample stream corresponding to two subsequent entries in a sequence of messages, the learn unit can record the time intervals between the two messages corresponding to the two subsequent entries, as shown in step 412 of FIG. 4. Using time-frequency techniques, such as the Fourier Transform, the learn unit can determine the frequency domain information from the time domain information and associate the frequency domain information to the corresponding sequence entry. The time domain or frequency domain information can then be used in the determination of whether to consider a particular sample stream of messages as "normal" client behavior, as shown in step 414 of FIG. 4.

Through the above techniques, the learn unit learns about the expected average frequency of a particular behavior pattern from the sample stream of messages. The learn unit can also apply the same time-frequency techniques to the sequence intervals.

In addition to constructing the sequences from a sample message stream, the learn unit can be configured to accept sequences of messages through other means such as a human operator.

As shown in step 418 of FIG. 4, the detect unit 17 can build a state machine and sequences with associated statistical and frequency information for each client or user, using the actual user message stream similar to the learn unit. As shown in step 420 of FIG. 4, for each sequence that the detect unit constructs in real time from the message stream, the detect unit 17 finds the corresponding historical sequence from the learn unit 16 and compares the constructed sequence or state machine created by the detect unit 17 to the recorded sequence or state machine created by the learn unit 16. As shown in step 422 of FIG. 4, the detect unit 17 then calculates the difference between the historical sequence information and the instant, constructed sequence information. In step 424 of FIG. 4, if the difference between the historical, recorded sequence of defined types of messages and the sequence of defined types of messages constructed by the detect unit 17, falls inside a preset window, the detect unit considers the behavior associated with the sequence as normal, otherwise, if the difference is greater than a designated value or range of values, the detect unit 17 can designate the behavior to be abnormal. If desired, the detect unit 17 can forward abnormal behaviors and the associated client information to an analysis unit. The analysis unit can be human operated or can take automated actions.

Exemplary Computer Architecture

In various exemplary embodiments of the present disclosure, the user behavior analyzer system can comprise a computer system 20, such as illustrated in FIG. 3, with the computer system including one or more processors, such as processor 24. One or more processors 24 can comprise the Learn Unit 16 and Detect Unit 17 described above, and can execute software implementing the routines described above. Each processor 24 can be connected to a communication infrastructure 22 (e.g., a communications bus, crossbar, or network). Various software embodiments are described in terms of this exemplary computer system. After reading this description, it will become apparent to a person skilled in the relevant art how to implement the invention using other computer systems and/or computer architectures.

Computer system 20 can include a display interface 27 that forwards graphics, text, and other data from the communication infrastructure 22 (or from a frame buffer not shown) for display on the display unit 29.

Computer system 20 can also include a main memory 26, preferably random access memory (RAM), and can also include a secondary memory 28. The secondary memory 28 can include, for example, a hard disk drive 30 and/or a removable storage drive 32, representing a floppy disk drive, a magnetic tape drive, an optical disk drive, etc. The removable storage drive 32 can read from and/or write to a removable storage unit 34 in a well known manner. Removable storage unit 34 represents a floppy disk, magnetic tape, optical disk, etc., which is read by and written to by removable storage drive 32. As will be appreciated, the removable storage unit 34 can include a computer usable storage medium having stored therein computer software and/or data.

In alternative embodiments, secondary memory 28 can include other similar means for allowing computer programs or other instructions to be loaded into computer system 20. Such means can include, for example, a removable storage unit 42 and an interface 40. Examples can include a program cartridge and cartridge interface (such as that found in video game console devices), a removable memory chip (such as an EPROM, or PROM) and associated socket, and other removable storage units 42 and interfaces 40 which allow software and data to be transferred from the removable storage unit 42 to computer system 20.

Computer system 20 can also include a communications interface 44. Communications interface 44 allows software and data to be transferred between computer system 20 and external devices such as the client devices 121, 122, and 123 in FIG. 1, via communications path 46. Examples of communications interface 44 can include a modem, a network interface (such as Ethernet card), a communications port, interfaces described above, etc. Software and data transferred via communications interface 44 are in the form of signals which can be electronic, electromagnetic, optical or other signals capable of being received by communications interface 44, via communications path 46. Note that communications interface 44 can provide a means by which computer system 20 can interface to a network such as the Internet.

Various embodiments can be implemented using software running (that is, executing) in an environment similar to that described above. The term "computer program product" is used to generally refer to a removable storage unit such as removable storage unit 34 in FIG. 3, a hard disk installed in a hard disk drive such as hard disk drive 30 in FIG. 3, or a carrier wave carrying software over a communication path such as communication path 46 in FIG. 3 (wireless link or cable) to a communication interface such as communication interface 44 in FIG. 3. A computer useable medium can include magnetic media, optical media, or other recordable media, or media that transmits a carrier wave or other signal. These computer program products can provide means for providing software to computer system 20.

Computer programs (also called computer control logic) can be stored in main memory 26 and/or secondary memory 28. Computer programs can also be received via communications interface 44. Such computer programs, when executed, enable the computer system 20 to perform the features of various embodiments as discussed herein. In particular, the computer programs, when executed, enable the processor 24 to perform features of various embodiments. Accordingly, such computer programs represent controllers of the computer system 20.

Various embodiments can be implemented as control logic in software, firmware, hardware or any combination thereof. In an embodiment implemented using software, the software may be stored in a computer program product and loaded into computer system 20 using removable storage drive 32, hard disk drive 30, or interface 40. Alternatively, the computer program product may be downloaded to computer system 20 over communications path 46. The control logic (software), when executed by the one or more processors 24, causes the processor(s) 24 to perform functions of the various embodiments as described herein.

In another embodiment, features are implemented primarily in firmware and/or hardware using, for example, hardware components such as application specific integrated circuits (ASICs). Implementation of a hardware state machine so as to perform the functions described herein will be apparent to persons skilled in the relevant art(s) from the teachings herein.

While the various disclosed features have been described in connection with a number of exemplary embodiments, and implementations, various embodiments are not so limited, but rather cover various modifications, and equivalent arrangements, which fall within the purview of the appended claims.

What is claimed is:

1. A method for identifying abnormal client behavior with respect to communications between one or more servers and one or more client devices communicatively coupled to said one or more servers, the method comprising:

receiving a plurality of messages at a server from a plurality of client devices communicatively coupled to the server;

grouping the plurality of messages into subsets of messages using a learn module of said server, with each subset of messages associated with a unique client identifier and with all messages within a subset being associated with the same unique client identifier;

identifying each message within a subset of messages as belonging to a defined type of message;

recording sequences of said defined types of messages within each of said subsets of messages using said learn module;

measuring time intervals between said defined types of messages using said learn module;

generating a state machine configured to model communications designated as constituting normal client behavior for defined types of messages, wherein the state machine comprises a determined order of a sequence of states and transitions configured based, at least in part, on the recorded sequences of defined types of messages and the measured time intervals between said defined types of messages that constitute normal client behavior;

constructing a sequence of defined types of messages received from a client device using a detect module of said server;

comparing the constructed sequence of defined types of messages to the state machine;

calculating any differences between the constructed sequence and the state machine, wherein the differences are based, at least in part, on whether an order of the constructed sequence deviates from the determined order of the sequence of the state machine; and in response to a determination that the constructed sequence differs from the state machine by more than a predetermined value or range of values, generating an output designating a constructed sequence as abnormal client behavior.

2. The method according to claim 1, further including:
determining a range for the number of defined types of messages recorded in a recorded sequence of messages.

3. The method according to claim 1, further including:
transforming measured time intervals between defined types of messages in the recorded sequences of defined types of messages using Fourier analysis to calculate an average expected frequency of each of the recorded sequences of defined types of messages.

4. The method according to claim 1, wherein:
each defined type of message corresponds to a unique client behavior, and wherein the recording of a sequence of defined types of client behaviors by said learn module begins after a predetermined number of said defined types of client behaviors have been received by the server.

5. The method according to claim 1, wherein:
the learn module analyzes a plurality of recorded sequences of defined types of messages and determines an average expectation of a particular type of message occurring in a recorded sequence based on a plurality of occurrences of the particular type of message in the plurality of recorded sequences.

6. The method according to claim 5, wherein:
the learn module further determines an average expectation of a second particular type of message occurring next to a first particular type of message in a recorded sequence of messages based on a plurality of occurrences of the first and second particular types of messages occurring next to each other in the plurality of recorded sequences.

7. A method for classifying client behavior, the method comprising:
receiving a plurality of messages from a client device;
grouping the plurality of messages into subsets of messages;
identifying each message within a subset of messages as belonging to a defined type of message;
constructing a sequence of said defined types of messages for at least one of said subsets of messages;
comparing the constructed sequence of the defined types of messages to a state machine, wherein the state machine is configured to model communications designated as constituting normal client behavior for the defined types of messages, wherein the state machine comprises a determined order of a sequence of states and transitions configured based, at least in part, on recorded sequences of the defined types of messages and measured time intervals between said defined types of messages that constitute normal client behavior;
calculating any differences between the constructed sequence and the state machine, wherein the differences are based, at least in part, on whether an order of the constructed sequence deviates from the determined order of the sequence of the state machine; and
in response to a determination that the constructed sequence differs from the state machine by more than a predetermined value or range of values, generating an output designating the constructed sequence as abnormal.

8. An apparatus for identifying abnormal communications between a client and a game server, the apparatus comprising a hardware processor configured to implement modules comprising:
a processing module configured to receive a plurality of messages from a client device;
the processing module configured to group the plurality of messages into subsets of messages;
the processing module configured to identify each message within a subset of messages as belonging to a defined type of message;
the processing module configured to construct a sequence of said defined types of messages for at least one of said subsets of messages;
the processing module configured to compare the constructed sequence of the defined types of messages to a state machine, wherein the state machine is configured to model communications designated as constituting normal client behavior for the defined types of messages, wherein the state machine comprises a determined order of a sequence of states and transitions configured based, at least in part, on recorded sequences of the defined types of messages and measured time intervals between said defined types of messages that constitute normal client behavior,
the processing module configured to calculate any differences between the constructed sequence and the state machine, wherein the differences are based, at least in part, on whether an order of the constructed sequence deviates from the determined order of the sequence of the state machine; and
the processing module configured to generate an output designating the constructed sequence as abnormal in response to a determination that the constructed sequence differs from the state machine by more than a predetermined value or range of values.

9. The apparatus according to claim 8, wherein:
the processing module is further configured to determine a range for the number of defined types of messages recorded in a recorded sequence of messages.

10. The apparatus according to claim 8, wherein:
the processing module is further configured to transform measured time intervals between defined types of messages in the recorded sequences of defined types of messages using Fourier analysis to calculate an average expected frequency of each of the recorded sequences of defined types of messages.

11. The apparatus according to claim 8, wherein:
each defined type of message corresponds to a unique client behavior, and wherein the recording of a sequence of defined types of client behaviors by said learn module begins after a predetermined number of said defined types of client behaviors have been received by the server.

12. The apparatus according to claim 8, wherein:
the processing module is further configured to analyze a plurality of recorded sequences of defined types of messages and determine an average expectation of a particular type of message occurring in a recorded sequence based on a plurality of occurrences of the particular type of message in the plurality of recorded sequences.

13. The apparatus according to claim 12, wherein:
the processing module is further configured to determine an average expectation of a second particular type of message occurring next to a first particular type of message in a recorded sequence of messages based on a plurality of occurrences of the first and second particular types of messages occurring next to each other in the plurality of recorded sequences.

14. A non-transitory computer-readable medium for use with a computer and encoded with program code, that when executed by a computer, causes the computer to:
 receive a plurality of messages from a client device;
 group the plurality of messages into subsets of messages;
 identify each message within a subset of messages as belonging to a defined type of message;
 construct a sequence of said defined types of messages for at least one of said subsets of messages;
 compare the constructed sequence of the defined types of messages to a state machine, wherein the state machine is configured to model communications designated as constituting normal client behavior for the defined types of messages, wherein the state machine comprises a determined order of a sequence of states and transitions configured based, at least in part, on recorded sequences of the defined types of messages and measured time intervals between said defined types of messages that constitute normal client behavior,
 calculate any differences between the constructed sequence and the state machine, wherein the differences are based, at least in part, on whether an order of the constructed sequence deviates from the determined order of the sequence of the state machine; and
 generate an output designating the constructed sequence as abnormal in response to a determination that the constructed sequence differs from the state machine by more than a predetermined value or range of values.

15. The non-transitory computer-readable medium according to claim 14, further comprising code, that when executed by a computer, causes the computer to:
 determine a range for the number of defined types of messages recorded in a recorded sequence of messages.

16. The non-transitory computer-readable medium according to claim 14, further comprising code, that when executed by a computer, causes the computer to:
 transform measured time intervals between defined types of messages in the recorded sequences of defined types of messages using Fourier analysis to calculate an average expected frequency of each of the recorded sequences of defined types of messages.

17. The non-transitory computer-readable medium according to claim 14, further comprising code, that when executed by a computer, causes the computer to:
 record a sequence of defined types of client behaviors after a predetermined number of said defined types of client behaviors have been received from a client device by a server;
 analyze a plurality of recorded sequences of defined types of messages and determine an average expectation of a particular type of message occurring in a recorded sequence based on a plurality of occurrences of the particular type of message in the plurality of recorded sequences; and
 determine an average expectation of a second particular type of message occurring next to a first particular type of message in a recorded sequence of messages based on a plurality of occurrences of the first and second particular types of messages occurring next to each other in the plurality of recorded sequences.

18. The method according to claim 7, wherein the plurality of messages from the client device is generated based, at least in part, on inputs to a user interface received by the client device.

* * * * *